(12) United States Patent
Bouat et al.

(10) Patent No.: US 8,478,851 B2
(45) Date of Patent: Jul. 2, 2013

(54) APPARATUS FOR USE WITH A GROUP COMMUNICATION NETWORK

(75) Inventors: Sebastien Bouat, St. Martin d'Uriage (FR); Jehan Monnier, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 342 days.

(21) Appl. No.: 12/160,729

(22) PCT Filed: Jan. 3, 2007

(86) PCT No.: PCT/EP2007/050020
§ 371 (c)(1),
(2), (4) Date: Sep. 17, 2008

(87) PCT Pub. No.: WO2007/085505
PCT Pub. Date: Aug. 2, 2007

(65) Prior Publication Data
US 2009/0037568 A1 Feb. 5, 2009

(30) Foreign Application Priority Data
Jan. 27, 2006 (EP) .................................... 06300076

(51) Int. Cl.
*G06F 15/16* (2006.01)

(52) U.S. Cl.
USPC .......... 709/223; 709/227; 709/224; 709/226; 709/228

(58) Field of Classification Search
USPC .................. 709/223, 224, 226, 228, 227
See application file for complete search history.

(56) References Cited

U.S. PATENT DOCUMENTS

| | | | |
|---|---|---|---|
| 7,466,810 B1 * | 12/2008 | Quon et al. | 379/201.01 |
| 7,869,387 B2 * | 1/2011 | Black | 370/260 |
| 2002/0023132 A1 | 2/2002 | Tornabene et al. | |
| 2003/0105820 A1 * | 6/2003 | Haims et al. | 709/205 |
| 2004/0009761 A1 * | 1/2004 | Money et al. | 455/406 |
| 2004/0192364 A1 | 9/2004 | Ranalli et al. | |
| 2005/0128981 A1 * | 6/2005 | Creamer et al. | 370/332 |
| 2005/0262248 A1 * | 11/2005 | Jennings et al. | 709/228 |
| 2006/0058007 A1 * | 3/2006 | Choksi | 455/406 |
| 2006/0242227 A1 * | 10/2006 | Rao et al. | 709/203 |
| 2006/0270362 A1 * | 11/2006 | Emrich et al. | 455/90.2 |
| 2007/0067409 A1 * | 3/2007 | Eslambolchi et al. | 709/217 |
| 2007/0136475 A1 * | 6/2007 | Leppisaari et al. | 709/227 |

\* cited by examiner

*Primary Examiner* — Djenane Bayard
(74) *Attorney, Agent, or Firm* — Adam P. Franks

(57) ABSTRACT

According to one aspect of the present invention, there is provided apparatus for use with a group communication network having an addressing database, the apparatus being addressable by a user terminal connected to the network, the apparatus comprising: a receiver module for receiving an invitation from a user terminal connected to the network, the receiving means being arranged to accept the invitation to cause the user terminal and the apparatus to establish a communication, a data retrieval module for obtaining details of one or more users to be added to the communication, the details of being obtained from other than the addressing database, and a communication module for adding at least one user to the communication using the obtained details.

10 Claims, 2 Drawing Sheets

APPARATUS FOR USE WITH A GROUP COMMUNICATION NETWORK

The present invention relates generally to the field of group communications.

In group communication systems, such as push-to-talk (also known as push-to-talk over cellular or PoC) and instant messaging, a user of a suitable user terminal is able to establish a communication and communicate with one or more members of a group in an easy manner.

In push-to-talk (PTT) each user manages a buddy list containing one or more buddies or groups of buddies with whom they may establish communications. In PTT the buddy list is not stored locally on the user's terminal device but on a network-based addressing database referred to in PTT as a group/list management server (GLMS). The GLMS is typically tightly coupled to a presence server enabling the presence status of each member in a buddy list to be obtained and displayed on a user terminal.

When a user switches on their user terminal the user's buddy list is obtained and downloaded from the GLMS to the user terminal, thereby enabling the user to establish a communication with any buddy, or group of buddies, in the buddy list.

In PTT systems the GLMS is the central element in each network through which all group and list information is managed. However, the PTT specifications do not provide any mechanism for enabling access to any other kinds of group or list servers or databases other than a GLMS. One of the downsides of this is that there is typically a large amount of existing group and list information stored in repositories other than GLMSs which is, therefore, inaccessible to PTT users. For example, in an enterprise or enterprise environment details of individual employees are typically available in a lightweight directory access protocol (LDAP) server maintained by the business IT department. Through such an LDAP server any employee may typically obtain, using a suitable interface, for example, the email address, telephone number, location code, and so on, of any other employee.

Additionally, distribution lists, such as email distribution lists may also be stored in an LDAP server.

Although it is technically possible for an enterprise IT department to duplicate all or part of the data stored in an LDAP server in a GLMS, to thereby make enterprise data available in the GLMS, it is generally considered to be inconvenient and troublesome to do so. For example, maintaining two identical lists in two separate and different environments typically results in the lists deviating from one another and being difficult to maintain synchronisation.

Accordingly, one aim of the present invention is overcome, or at least alleviate, at least some of the above-mentioned problems.

According to a first aspect of the present invention, there is provided apparatus for use with a group communication network having an addressing database, the apparatus being addressable by a user terminal connected to the network. The apparatus comprises a receiver module for receiving an invitation from a user terminal connected to the network, the receiving means being arranged to accept the invitation to cause the user terminal and the apparatus to establish a communication, a data retrieval module for obtaining details of one or more users to be added to the communication, the details being obtained from other than the addressing database, and a communication module for adding at least one user to the communication using the obtained details.

Advantageously, the apparatus enables a user terminal, such as a push-to-talk user terminal, to access group or list information stored outside of the group communication network in a simple and efficient manner, without requiring any modification to either the user terminals or the group communication system.

Suitably, the communication module is arranged to remove the apparatus from the communication once at least one user has been added to the communication.

Where the obtained details are not in a format addressable by the network, the apparatus may resolve the obtained details into a form addressable by the network.

The apparatus further may further comprise a storage medium for storing pre-fetched details of the one or more users addressable by the network.

The apparatus may be suitably arranged for use where the group communication network is a push-to-talk, push-to-talk over cellular network or instant messaging network.

According to a second aspect of the present invention, there is provided a method, for use with a user agent addressable through a group communication network having an addressing database, for enabling a user terminal of the network to establish a communication with one or more other users. The method comprises receiving from a user an invitation to add the user agent to the communication, accepting the invitation to cause the communication to be established, obtaining details of or more or more users to be added to the communication, the details being obtained from other than the addressing database, and adding at least one user to the communication using the obtained details.

The method may further comprise the user agent removing itself from the communication once at least one user has been added to the communication.

The method may further comprise, where the obtained details are not in a format addressable by the network, resolving the obtained details into a form addressable by the network.

The method may further comprise pre-fetching the details of the one or more users addressable by the network and storing the pre-fetched details.

Suitably, the method may be adapted for use with a push-to-talk, push-to-talk over cellular, or instant messaging network.

Embodiments of the invention will now be described, by way of non-limiting example only, with reference to the accompanying drawings, in which.

Figure 1:
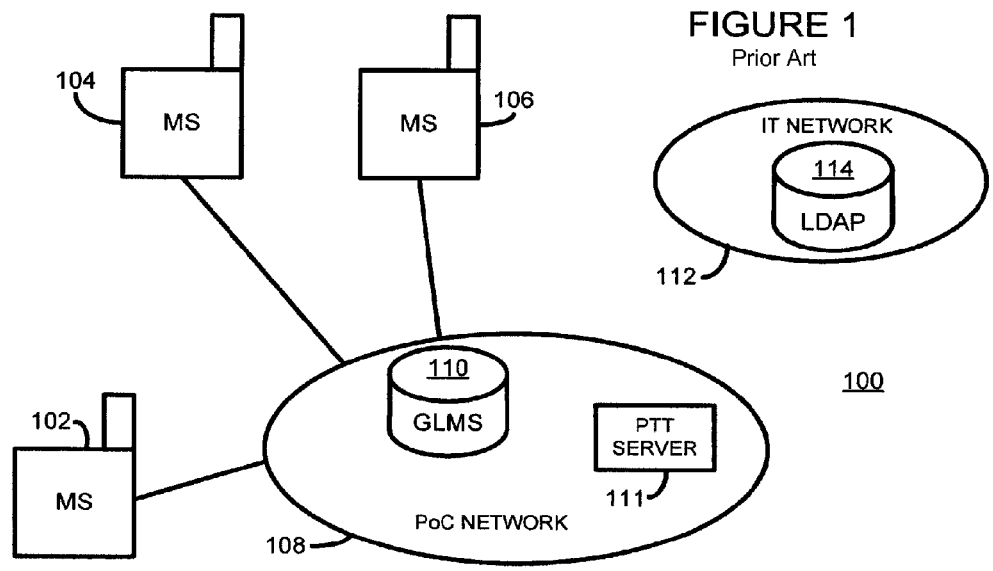
FIG. 1 is a simplified block diagram of a typical push-to-talk system according to the prior art.

Referring now to FIG. 1, there is shown a system 100 according to the prior art. The system includes a push-to-talk network 108 through which user terminals 102, 104 and 106 may communicate. The PTT network 108 is controlled and managed by a PTT server 111 in a conventional manner. Address details of each of the user terminals 102, 104 and 106 are held in a group/list management server (GLMS) 110 within the PTT network 108 enabling each respective user of each respective user terminal 102, 104 and 106 to enter into communication with each other.

Separate from the PTT network 108 is a conventional enterprise information technology (IT) network 112. Such a network may be used, for example, to enable enterprise computers and computer hardware to communicate with each other in a conventional manner. As part of the network 112 a lightweight directory access protocol (LDAP) server 114 is provided. The LDAP server 114, for example, may contain a list of all of the email addresses, telephone numbers, location codes, employment status, etc. of each employee of the enterprise, as well as additional information such as email distribution lists and the like.

As previously mentioned, an employee of the enterprise, for example the user of the user terminal 106, is unable, using PTT, to access information, such as lists information, in the LDAP server 114 of the enterprise network 112, and is thus unable to establish a PTT communication with any other employee, or group of employees, unless that employee, or group, information has been made available to the GLMS 110 of the PTT network 108. As previously mentioned, it is generally undesirable for an enterprise IT department to manage duplicated lists on both the LDAP 114 and on the GLMS 110.

Figure 2:
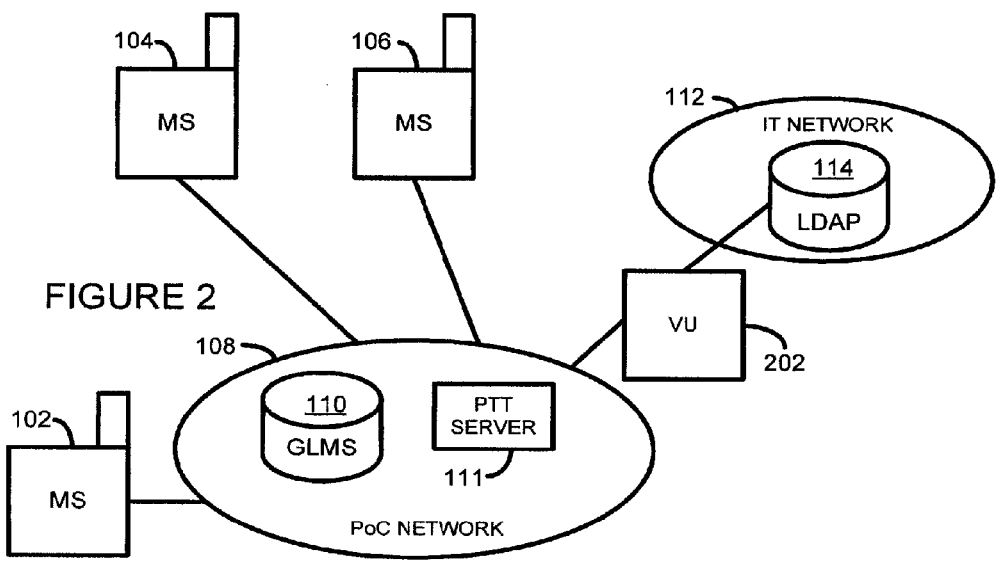
FIG. 2 is a simplified block diagram of a push-to-talk system according to an embodiment of the present invention.
Figure 3:
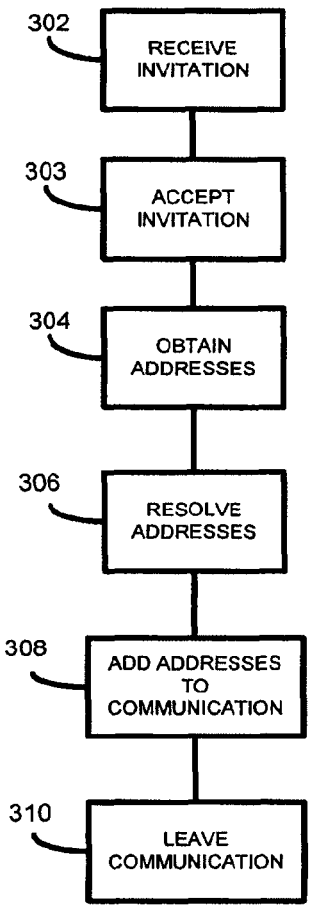
FIG. 3 is a flow diagram outlining example processing steps that may be taken by a virtual user agent according to one embodiment of the present invention.
Figure 4:
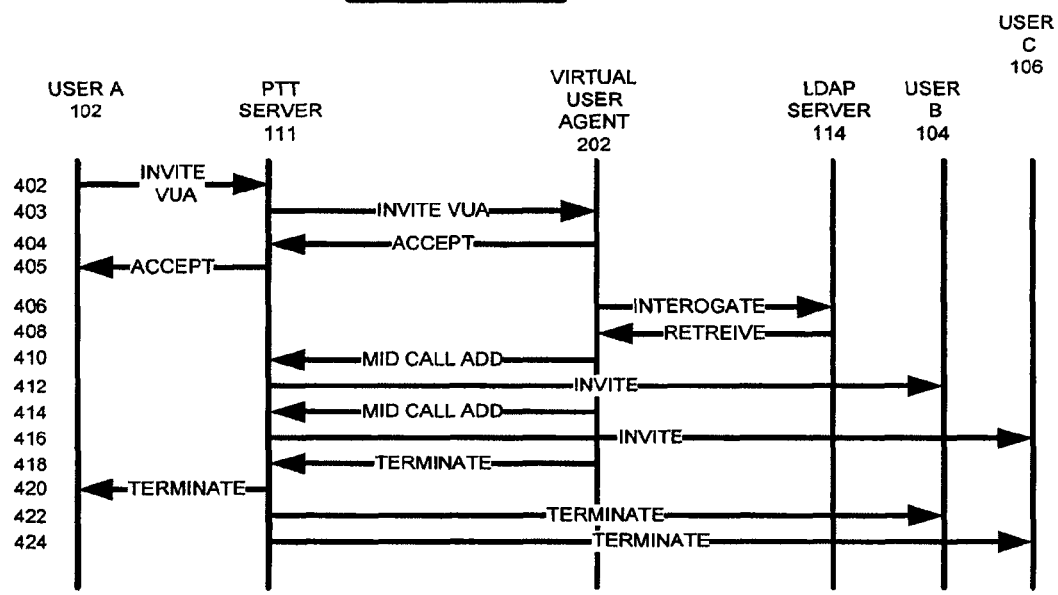
FIG. 4 is a message flow diagram outlining example messages which may flow between different elements of the system 200 according to an embodiment of the present invention.

Referring now to FIG. 2 is shown a simplified block diagram showing a system according to an embodiment of the present invention. FIG. 2 is essentially the same as FIG. 1, and like references indicate like elements. In addition to the elements of FIG. 1 is additionally provided a virtual user agent 202 according to an embodiment of the present invention, which is described in more detail below. Additional reference is made to FIG. 3 which is a flow diagram outlining example processing steps taken by the virtual user agent 202, and FIG. 4 which is a message flow diagram outlining example messages which may flow between different elements of the system 200 according to an embodiment of the present invention. It should be noted that the messages shown in FIG. 4 do not necessarily represent messages of any particular protocol, but are used to illustrate in a general manner the type of messages that may be sent.

The virtual user agent 202 appears to the PTT network 108 as a conventional PTT user terminal, such as the PTT terminals 102, 104 and 106. In other words, the virtual user agent 202 has an address in a format suitable for the PTT network 108 and is addressable by another terminal of the network. For example, the virtual user agent may have a SIP address and be connected to the PTT network 108 via a suitable Internet protocol (IP) network. In this way a user of a user terminal, such as the user terminal 102, 104 or 106, may store the address details of the virtual user agent 202 in their buddy list in the GLMS 110 thereby enabling the user to establish a communication with the virtual user agent 202 in the conventional manner. As is well known in the art, a PTT communication may be established by selecting the address of a user, buddy or group of buddies, with whom it is desired to establish a communication, and activating a suitable user interface feature to cause an invitation, such as the Invite-type message 402, to be sent to the desired user or users.

The virtual user agent 202 may be a suitable computer program or application running on a suitable computing device such as a computer server of the IT network 112. Alternatively the virtual user agent 202 may run on a suitable computer server of the PTT network 108 or a different, unrelated computing device.

As previously mentioned the LDAP server 114 contains directory information relating to employees of the enterprise to which the IT network 112 belongs. In addition to information about individual employees, the LDAP server 114 additionally contains one or more email distribution lists. Such email distribution lists are generated by an administrator of the IT network 112 to facilitate the sending of email messages to groups of employees or members. For email, the LDAP server 114 may contain an email distribution group named "DL_All_Finance_Employees" containing the email addresses of every employee of the enterprise working in the finance department. Thus, in the present example, an email sent to the addressee "DL_All_Finance_Employees" would cause an email server handling the outgoing email to interrogate the LDAP sever 114, to obtain the individual email addresses of every member of the distribution list, and to send an email to each employee in the finance department.

In one embodiment the virtual user agent 202 is attributed an address representative of a distribution list stored in the LDAP server 114. For example, in the present example the address of the virtual user agent 202 may be attributed as SIP:DL_All_Finance_Employees@hp.com The LDAP server 114 may also contain other group or list information as appropriate.

To access information not stored in the GLMS of the PTT network 108 a user, such as the user of the user terminal 102, invites the virtual user agent 202 to a PTT communication, for example by causing the user terminal 102 to send an Invite-type message 402 to the PTT server 111. The PTT server 111 receives the Invite message 402 and forwards an Invite message 403 to the virtual user agent 202.

The virtual user agent 202 receives the Invite message 403, step 302, through a suitable receiver module (not shown), and is arranged, again through the receiver module, to automatically accept the incoming invitation, step 303, and does so by responding to the PTT server 111 with an Accept-type message 404. The PTT server 111 forwards the Accept message 404 to the user terminal 102 as Accept message 405. Once the communication has been accepted the virtual user agent 202 obtains, using a suitable data retrieval module (not shown), (step 304 and messages 406 and 408) from the LDAP server 114 a list of one or more entries therein.

The virtual user agent 202 may be configured to obtain information from the LDAP in numerous different ways. For example, in the present embodiment the virtual user agent 202 is configured by an administrator of the IT network 112 to have the address SIP: DL_All_Finance_Employees@hp.com. The virtual user agent 202 is thus configured to retrieve details of the email distribution list DL_All_Finance_Employees. If the LDAP server 114 also stores SIP addresses for each entry the virtual user agent 202 is preferably arranged to obtain the SIP address of each member of the distribution list. If, however, the LDAP server 114 does not contain SIP addresses for each member of the distribution list the virtual user agent 202 is preferably arranged to obtain the email addresses of each member of the distribution list.

If the virtual user agent 202 does not obtain a SIP address from the LDAP server 114 an address resolution (step 306) is required to obtain, if available, the corresponding SIP address. The address resolution of an email address to a SIP address may be achieved, for example, by prefixing each email address with "SIP:" for systems in which employees are allocated an email address in the form firstname.surname@enterprisedomainname, and a SIP address in the form SIP: firstname.surname@enterprisedomainname. If this is not the case, a known address resolution module (not shown) may be interrogated to perform the address resolution.

Once the required addresses have been obtain and/or appropriately resolved into valid SIP addresses the virtual user agent adds (step 308), through a suitable communication module (not shown), the obtained SIP addresses to the current communication with the user terminal 102. This may be achieved, for example, by the virtual user agent 202 sending a mid-call-add type message (410, 414) to the PTT server 111 to cause the user terminals 104 and 106 to be invited (messages 412 and 416) to the current communication.

Once the user terminals 104 and 106 have been added to the communication the virtual user agent 202 can remove itself (step 310) from the communication by sending a terminate-type message 418 to the PTT server 111. Upon receipt of this message the PTT server 111 forwards the terminate message as messages 420, 422 and 424 to user terminals 102, 104 and 106 respectively, and the virtual user agent 202 is effectively removed from the communication, whilst the user terminals 102, 104 and 106 remain in the communication.

In this way, the user of the user terminal 102 can establish a push-to-talk communication with one or more members of a group, details of which are stored outside of the GLMS 110 of the PTT network 108.

In a preferred embodiment the virtual user agent 202 is arranged to perform the steps 302 to 310 automatically, without requiring any human or other manual intervention.

The above-mentioned receiver module, data retrieval module and communication module, may be suitably provided as appropriate computer programs, computer software, software objects, and the like.

Alternatively, the virtual user agent 202 may pre-fetch and obtain any necessary address resolution prior to receiving an invitation to a communication. In this case the step 304 of obtaining address may be arranged to obtain the addresses from a storage medium internal to the virtual user agent 202, such as an internal memory or other internal or externally accessible storage device.

In a further embodiment the virtual user agent 202 may be pre-configured with one or more SIP addresses of users with whom the user of a terminal, such as the user terminal 102, 104 and 106, wishes to establish a communication.

For example, the user of the user terminal 102 may use a web interface (not shown) to configure one or more SIP addresses in the virtual user agent 202. In this way, the virtual user agent 202 becomes a user configurable user agent for enabling the user to establish a communication with one or more preconfigured users simply by inviting or adding the virtual user agent to a communication.

In a yet further embodiment a user is able to access group and list information stored in the GLMS of a foreign PTT network, in a similar manner to that described above, by accessing a virtual user agent operated either by user's home PTT network or by a foreign PTT network.

Whilst the above non-limiting embodiments have been described with reference to push-to-talk communications, those skilled in the art will appreciate that the above-described embodiments could be suitably modified for use with other group communication systems, such as instant messaging systems and the like. Reference herein to LDAP servers is not limited thereto, and access may be suitably made to any appropriate database, data store, or other appropriate data repository.

The invention claimed is:

1. Apparatus implemented on a suitably programmed processor for use with a server associated with a group communication network, in which the server is communicatively coupled to an addressing database, and in which the apparatus is addressable by a user terminal connected to the network, the apparatus comprising:
 a receiver module that receives an invitation from the user terminal connected to the network and accepts the invitation to cause the user terminal and the apparatus to establish a communication;
 a data retrieval module that obtains details of one or more users of a number of other user terminals to be added to the communication, in which the details are obtained from a database of the one or more users other than the addressing database; and
 a communication module that adds at least one of the other user terminals to the communication using the obtained details;
 in which the apparatus appears to the group communication network as a user terminal, the apparatus having an address in a format suitable for the group communication network.

2. The apparatus of claim 1, wherein the communication module removes the apparatus from the communication once at least one of the other user terminals has been added to the communication.

3. The apparatus of claim 1, further comprising, where the obtained details are not in a format addressable by the network, the data retrieval module resolves the details into a form addressable by the network.

4. The apparatus of claim 1, wherein the apparatus further comprises a storage medium for storing pre-fetched details of the one or more users of the number of other user terminals addressable by the network.

5. The apparatus of claim 1, where the group communication network is one of a push-to-talk, push-to-talk over cellular network and an instant messaging network.

6. A method, implemented on a suitably programmed processor, for use with a user agent addressable through a server associated with a group communication network, in which the server is communicatively coupled to an addressing database, for enabling a user terminal of the network to establish a communication with one or more other users of a number of other user terminals, comprising:
 at a receiver module of the user agent:
  receiving from the user terminal an invitation to add the user agent to the communication, and
  accepting the invitation to cause the communication to be established;
 at a data retrieval module of the user agent, obtaining details of one or more users of a number of other user terminals to be added to the communication, in which the details are obtained from a database of the one or more users other than the addressing database; and at a communications module of the user agent, adding at least one of the other user terminals to the communication using the obtained details;
 in which the user agent appears to the group communication network as a user terminal, the user agent having an address in a format addressable by the group communication network.

7. The method of claim 6, further comprising the user agent removing itself from the communication once at least one of the other user terminals has been added to the communication.

8. The method of claim 6, further comprising, where the obtained details are not in a format addressable by the network, at the data retrieval module, resolving the obtained details into a form addressable by the network.

9. The method of claim 6, further comprising pre-fetching the details of the one or more users of the number of other user terminals addressable by the network and storing the pre-fetched details.

10. The method of claim 6, wherein the group communication network comprises one of a push-to-talk, push-to-talk over cellular, or instant messaging network.

* * * * *